(12) United States Patent
Daniel et al.

(10) Patent No.: US 11,261,774 B2
(45) Date of Patent: Mar. 1, 2022

(54) METHOD FOR ASCERTAINING A $NO_x$ CONCENTRATION AND A $NH_3$ SLIP DOWNSTREAM FROM AN SCR CATALYTIC CONVERTER

(71) Applicant: Robert Bosch GmbH, Stuttgart (DE)

(72) Inventors: Christian Daniel, Leonberg (DE);
Edgar Klenske, Renningen (DE);
Heiner Markert, Stuttgart (DE);
Martin Schiegg, Korntal-Muenchingen (DE); Stefan Angermaier, Stuttgart (DE); Volker Imhof, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/651,104

(22) PCT Filed: Oct. 9, 2018

(86) PCT No.: PCT/EP2018/077476
§ 371 (c)(1),
(2) Date: Mar. 26, 2020

(87) PCT Pub. No.: WO2019/076686
PCT Pub. Date: Apr. 25, 2019

(65) Prior Publication Data
US 2020/0224570 A1 Jul. 16, 2020

(30) Foreign Application Priority Data
Oct. 16, 2017 (DE) .......................... 102017218480.9

(51) Int. Cl.
*F01N 3/20* (2006.01)
*F01N 11/00* (2006.01)
(Continued)

(52) U.S. Cl.
CPC .............. *F01N 3/208* (2013.01); *F01N 11/00* (2013.01); *G06N 3/0472* (2013.01); *G06N 20/00* (2019.01);
(Continued)

(58) Field of Classification Search
CPC .. F01N 3/208; F01N 11/00; F01N 2900/1616; F01N 9/00; F01N 2560/026;
(Continued)

(56) References Cited

U.S. PATENT DOCUMENTS

2017/0106338 A1* 4/2017 Singh ................. B01D 53/9431
2017/0370261 A1* 12/2017 Sun .......................... F01N 3/208
(Continued)

FOREIGN PATENT DOCUMENTS

CN 101265826 A 9/2008
CN 106948911 A 7/2017
(Continued)

OTHER PUBLICATIONS

International Search Report for PCT/EP2018/077476 dated Dec. 5, 2018.

*Primary Examiner* — Brandon D Lee
(74) *Attorney, Agent, or Firm* — Norton Rose Fulbright US LLP; Gerard Messina

(57) ABSTRACT

A method is provided for ascertaining a $NO_x$ concentration and an $NH_3$ slip downstream from an SCR catalytic converter of an internal combustion engine of a vehicle. State variables of an internal combustion engine as first input variables and an updated $NH_3$ fill level of the SCR catalytic converter as a second input variable cooperate with at least one machine learning algorithm or at least one stochastic model. The at least one machine learning algorithm or at least one stochastic model calculates the $NO_x$ concentration and the $NH_3$ slip downstream from the SCR catalytic con-
(Continued)

verter as a function of the first input variables and the second input variables and output the same as output variables.

19 Claims, 2 Drawing Sheets

(51) Int. Cl.
    *G06N 20/00*     (2019.01)
    *G06N 3/04*     (2006.01)
    *F01N 9/00*     (2006.01)

(52) U.S. Cl.
    CPC .......... *F01N 9/00* (2013.01); *F01N 2560/026* (2013.01); *F01N 2560/06* (2013.01); *F01N 2560/14* (2013.01); *F01N 2610/02* (2013.01); *F01N 2900/1402* (2013.01); *F01N 2900/1616* (2013.01); *F01N 2900/1622* (2013.01)

(58) Field of Classification Search
    CPC ............. F01N 2560/06; F01N 2560/14; F01N 2610/02; F01N 2900/1402; F01N 2900/1622; F01N 3/103; F01N 2550/02; F01N 2900/0408; F01N 2900/0601; F01N 2900/1404; F01N 2900/1406; F01N 2900/1411; G06N 3/0472; G06N 20/00; Y02A 50/20; Y02T 10/40; Y02T 10/12
See application file for complete search history.

(56) References Cited

U.S. PATENT DOCUMENTS

| | | | |
|---|---|---|---|
| 2018/0120813 A1* | 5/2018 | Coffman | G06F 30/00 |
| 2018/0274417 A1* | 9/2018 | Mao | F01N 3/2066 |
| 2019/0195114 A1* | 6/2019 | Ono | F01N 3/2066 |
| 2020/0386136 A1* | 12/2020 | Shead | F01N 3/2066 |

FOREIGN PATENT DOCUMENTS

| | | | |
|---|---|---|---|
| DE | 10010745 A1 | 3/2002 | |
| DE | 102004046640 A1 | 3/2006 | |
| DE | 102005012568 A1 | 9/2006 | |
| DE | 102007045263 A1 | 4/2009 | |
| DE | 102010002620 A1 | 9/2011 | |
| DE | 102015207670 A1 | 10/2016 | |
| DE | 102017102964 A1 | 8/2017 | |
| DE | 102016216951 A1 | 3/2018 | |
| EP | 2963271 A1 | 1/2016 | |
| JP | 2012026417 A | 2/2012 | |
| WO | WO-2008022177 A2 * | 2/2008 | ........... G01N 33/686 |

* cited by examiner

METHOD FOR ASCERTAINING A $NO_x$ CONCENTRATION AND A $NH_3$ SLIP DOWNSTREAM FROM AN SCR CATALYTIC CONVERTER

FIELD

The present invention relates to a method for ascertaining a $NO_x$ concentration and an $NH_3$ slip downstream from an SCR catalytic converter of an internal combustion engine of a vehicle.

BACKGROUND INFORMATION

Improved control and further reduction of harmful emissions are one of the most important challenges for future internal combustion engines. Conventionally, SCR catalytic converters (Selective Catalytic Reduction) are used to reduce nitrogen oxides ($NO_x$) to nitrogen contained in the exhaust gas of the internal combustion engine in the presence of a reducing agent. The nitrogen oxides in the exhaust gas may hereby be substantially reduced. Ammonia ($NH_3$), which is admixed with the exhaust gas, is required for the reaction process. $NH_3$ or $NH_3$ separating reagents are used as the reducing agent. For example, an aqueous urea solution may be used for this, which is injected into the exhaust gas system upstream from the SCR catalytic converter with the aid of a metering device. $NH_3$, which acts as a reducing agent, forms from this solution. The metering of the reducing agent is carried out preferably as a function of the engine nitrogen oxide emissions and is thus preferably dependent on the instantaneous speed and torque of the engine. The metering is then carried out accordingly, as a function of operating parameters of the internal combustion engine and as a function of exhaust gas parameters. Although an SCR catalytic converter has a certain $NH_3$ storage capacity but when this is exceeded, $NH_3$ may escape downstream from the SCR catalytic converter, which is also designated as $NH_3$ slip. The instantaneous storage level of $NH_3$ in the SCR catalytic converter is also designated as the fill level.

A method is described in German Patent Application No. DE 102015207670 A1 for monitoring the storage capacity of an SCR catalytic converter for $NH_3$. A phase with hyperstoichiometric metering, provided for diagnostic purposes, is terminated prematurely as soon as a $NH_3$ slip may be inferred due to increased signals from a $NO_x$ sensor situated downstream from the SCR catalytic converter.

German Patent Application No. DE 102010002620 A1 describes a method for operating an SCR catalytic converter for post-treatment of exhaust gases of an internal combustion engine, in which a reducing agent is admixed to reduce nitrogen oxides ($NO_x$) in the exhaust gas, and the required amount of reducing agent to be metered is calculated using a model. In the case of a deviation above a predefinable threshold between a measured $NO_x$ sensor value downstream from the SCR catalytic converter and a modeled $NO_x$ value downstream from the SCR catalytic converter, a discontinuous adaptation is carried out by reducing the fill level in the SCR catalytic converter and adjusting the system as a function of a detected underdosage or overdosage of the reducing agent.

SUMMARY

Example methods are provided in accordance with the present invention for ascertaining a $NO_x$ concentration and an $NH_3$ slip downstream of an SCR catalytic converter of an internal combustion engine of a vehicle. Variables, which represent state variables of an internal combustion engine, in particular state variables of the exhaust gas of the internal combustion engine, are used here as first input variables of at least one machine learning algorithm or at least one stochastic model. In addition, a variable, which represents an instantaneous $NH_3$ fill level of the SCR catalytic converter, is used as additional input variable. The $NO_x$ concentration downstream of the SCR catalytic converter, in particular at the outlet of the SCR catalytic converter, and the $NH_3$ slip downstream of the SCR catalytic converter, in particular at the outlet of the SCR catalytic converter, are calculated and output by the at least one machine learning algorithm or at least one stochastic model as a function of the first input variables and the additional input variable. The output variables of the modeling of the SCR catalytic converter are thus the $NH_3$ slip downstream from the SCR catalytic converter and the $NO_x$ concentration downstream from the SCR catalytic converter, which, for prevalent systems with an arrangement of the SCR catalytic converter at the end of the exhaust gas system, corresponds to the discharged $NO_x$ concentration (tailpipe $NO_x$ emission) of the vehicle. The $NO_x$ concentration may be separately calculated and output for NO and $NO_2$. An example method according to the present invention provides an improved measuring system for the output variables of $NO_x$ concentration downstream from the SCR catalytic converter and $NH_3$ slip of the SCR catalytic converter for an internal combustion engine. $NO_x$ sensors downstream from the SCR catalytic converter are presently not yet available in all vehicles for cost reasons. In addition, they often provide no results or unreliable results with respect to emissions in particularly critical operating states, e.g., during a cold start. There are no sensors in present systems for the updated fill level of $NH_3$ of an SCR catalytic converter. Instantaneous, quantitative statements about the actual $NH_3$ slip using present sensor systems are difficult, especially in particular operating states, such as cold starts.

The described, dynamic, data-based modeling in accordance with the present invention has the advantage that higher accuracies are achieved than in prevalent physical or chemical models, and they are less expensive to develop due to their universality and are also more easily adaptable to new requirements.

In accordance with the present invention, the particularly preferred variant including convolutional neural networks (CNN) facilitates a particularly fast and efficient training, even with large amounts of training data, since CNN may also cope well with a high input dimensionality. In addition, these models require comparatively little storage space, in particular in the case of lots of training data.

The alternative, particularly preferred variant, in accordance with the present invention, using Gaussian process models enables probabilistic statements about the reliability of the model, e.g., confidence intervals. They may also provide relatively precise results in the case of little training data.

The models require comparatively little storage space, in particular at low amounts of training data.

The output variables of this improved measuring system may be used in diverse ways. For one preferred use, the machine learning algorithms or stochastic models are instantaneously calculated on a processor in the vehicle during operation. This may also be carried out using standard hardware, e.g., by the processing unit of a vehicle control unit. A control unit is particularly suited for this, which also has, in addition to a conventional processor core, a dedicated hardware unit to support the processor core during the calculation of the machine learning algorithms or stochastic models. An advanced modeling unit, as is described, e.g., in German Patent Application No. DE 10 2016 216951 A1, is particularly suited as such a hardware unit.

The input variables may correspond to instantaneous sensor data when used in driving operation, or may be calculated from the same or may likewise originate from models about the vehicle variables. One or multiple of the variables of exhaust gas temperature, exhaust gas pressure, exhaust gas mass flow, $NO_x$ concentration upstream from the SCR catalytic converter, $NO/NO_2$ ratio, and space velocity of the exhaust gas, are particularly suited for this purpose, in addition to the variable describing the initial $NH_3$ fill level of the SCR catalytic converter. A precise modeling of the functionality of the SCR catalytic converter is possible due to the selection of these input variables, and thus a precise calculation of the desired output variables.

Using these ascertained output variables, the exhaust aftertreatment may be improved during driving operation, e.g., by controlling interventions in the exhaust aftertreatment itself (e.g., via an adapted metering or an intervention in the regulation of $NO_x$/soot) or through control interventions into other driving variables, e.g., a speed throttling or, for a hybrid motor, a switch from an internal combustion operation into an operation using the E-machine. The output variables may also be used for diagnostic purposes of the exhaust aftertreatment or a warning message with respect to excessive emissions. In particular, predictive calculations, and thus predictive control interventions in the driving operation, are also possible due to the modeling.

In systems, in which the output variables of the machine learning algorithms or the stochastic models are also redundantly determined by sensors, these may also be used for monitoring or plausibility checking of the corresponding sensors or to correct or replace the sensor results in certain operating ranges known to be difficult for sensors.

The example method preferably runs repeatedly for sequential time increments. Thus, a calculation of the instantaneous output variables is possible in real-time during driving operation. The calculated output variables may also in turn be utilized as input variables for the calculations in the next time increment. One variant is particularly preferred, in which, in addition to the described calculations, a mass balance or a balance of the amount of substances of supplied $NH_3$, converted $NH_3$ (desired reduction of nitrogen oxides to nitrogen), and lost $NH_3$ ($NH_3$ slip and $NH_3$ oxidation), the $NH_3$ conversion being based on a stoichiometric calculation. For this purpose, in addition to the described output variables of $NO_x$ concentration and $NH_3$ slip, the $NH_3$ oxidation in the catalytic converter is calculated on the basis of the described input variables and utilized as an input variable for the stoichiometric calculation by the at least one machine learning algorithm or the at least one stochastic model. The updated $NH_3$ fill level, ascertained from this consideration and the knowledge of the initial fill state, is used in turn as an input value for the calculations of $NO_x$ concentration, $NH_3$ slip, and $NH_3$ oxidation in the next time increment. The stoichiometric calculation thus considers the chemical reactions taking place in the SCR catalytic converter. The updated $NH_3$ fill level is best considered by this combination of data-based dynamic modeling using the mass balance or the balance of the amount of substances. It thus leads to the best results during the calculation of the desired output variables.

In one alternative configuration according to the present invention, the described modeling may also be used together with engine models (machine learning algorithms, stochastic models, physical models) in engine development. The input variables are here collected from the engine models, which simulate engine behavior, e.g., for certain driving situation or driving cycles.

It is here particularly advantageous that arbitrary driving cycles and their effects on the functionality of the SCR catalytic converter may already be taken into consideration in the simulation and modeling of the engine. The output variables of the modeling of the SCR catalytic converter via the machine learning algorithms or the stochastic models or the stoichiometric calculation may in turn be used here as input variables for the engine models for the next time increment. As a whole, the effects of the SCR catalytic converter on engine emissions may thus be precisely taken into consideration for simulated engines, and thus adaptations of the engine layout or the exhaust aftertreatment, with the goal of emission reductions, may thus already be carried out in engine development.

BRIEF DESCRIPTION OF THE DRAWINGS

The present invention is described in greater detail below with reference to the figures and by way of exemplary embodiments.

DETAILED DESCRIPTION OF EXAMPLE EMBODIMENTS

It is important for controlling engines and their exhaust aftertreatment during operation and for developing internal combustion engines with improved exhaust aftertreatment to have precise and highly up-to-date information available about the effectiveness of the exhaust aftertreatment components used. This is often challenging in the SCR catalytic converter; above all due to the availability and the responding behavior of the sensors for operating variables, such as nitrogen oxide concentration or $NH_3$ slip. If an SCR catalytic converter functions in certain operating situations worse than intended, this may have significant effects on the emission behavior of the engine; however, under certain circumstances, it may not be discovered or may be discovered only after long delays.

Figure 1:
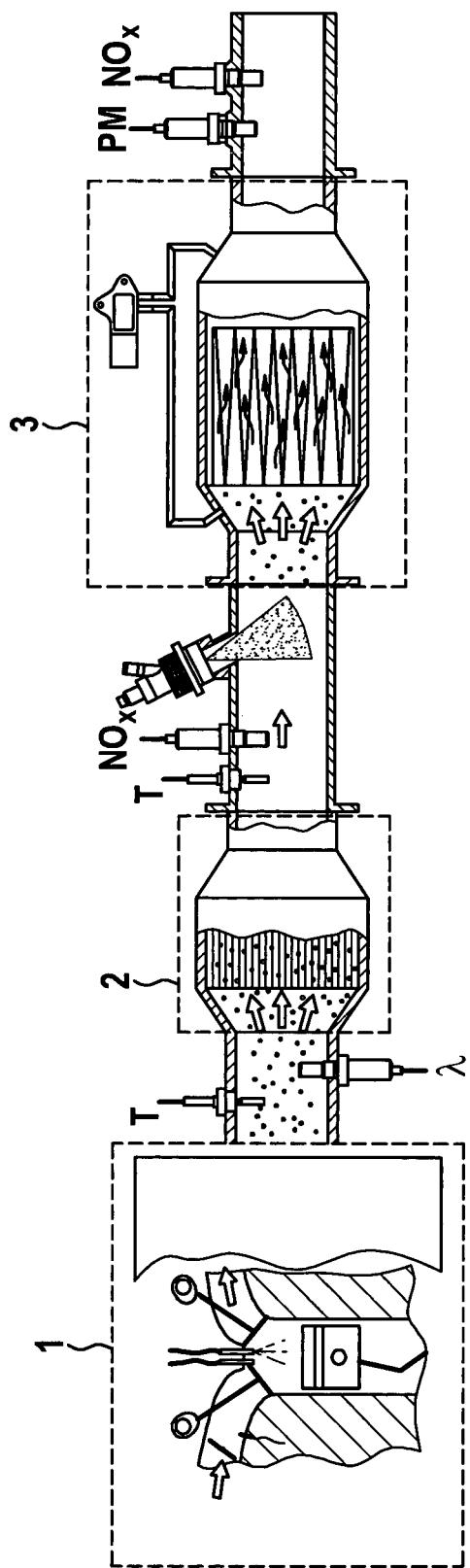
FIG. 1 shows a schematic detail of the exhaust gas system of an exemplary diesel engine.

FIG. 1 schematically shows a detail of the exhaust gas system of an exemplary diesel engine. An engine detail 1 with a combustion chamber is here schematically shown as the beginning of the exhaust gas system. After combustion, the exhaust gas flows through a diesel oxidation catalytic converter 2. A temperature sensor and a lambda sensor are situated between engine detail 1 and diesel oxidation catalytic converter 2. An SCR catalytic converter 3 follows in the exhaust gas system downstream from diesel oxidation catalytic converter 2. A temperature sensor and a $NO_x$ sensor are situated between diesel oxidation catalytic converter 2 and SCR catalytic converter 3. A particle sensor (PM) and a $NO_x$ sensor are situated downstream from the SCR catalytic converter.

Figure 2:
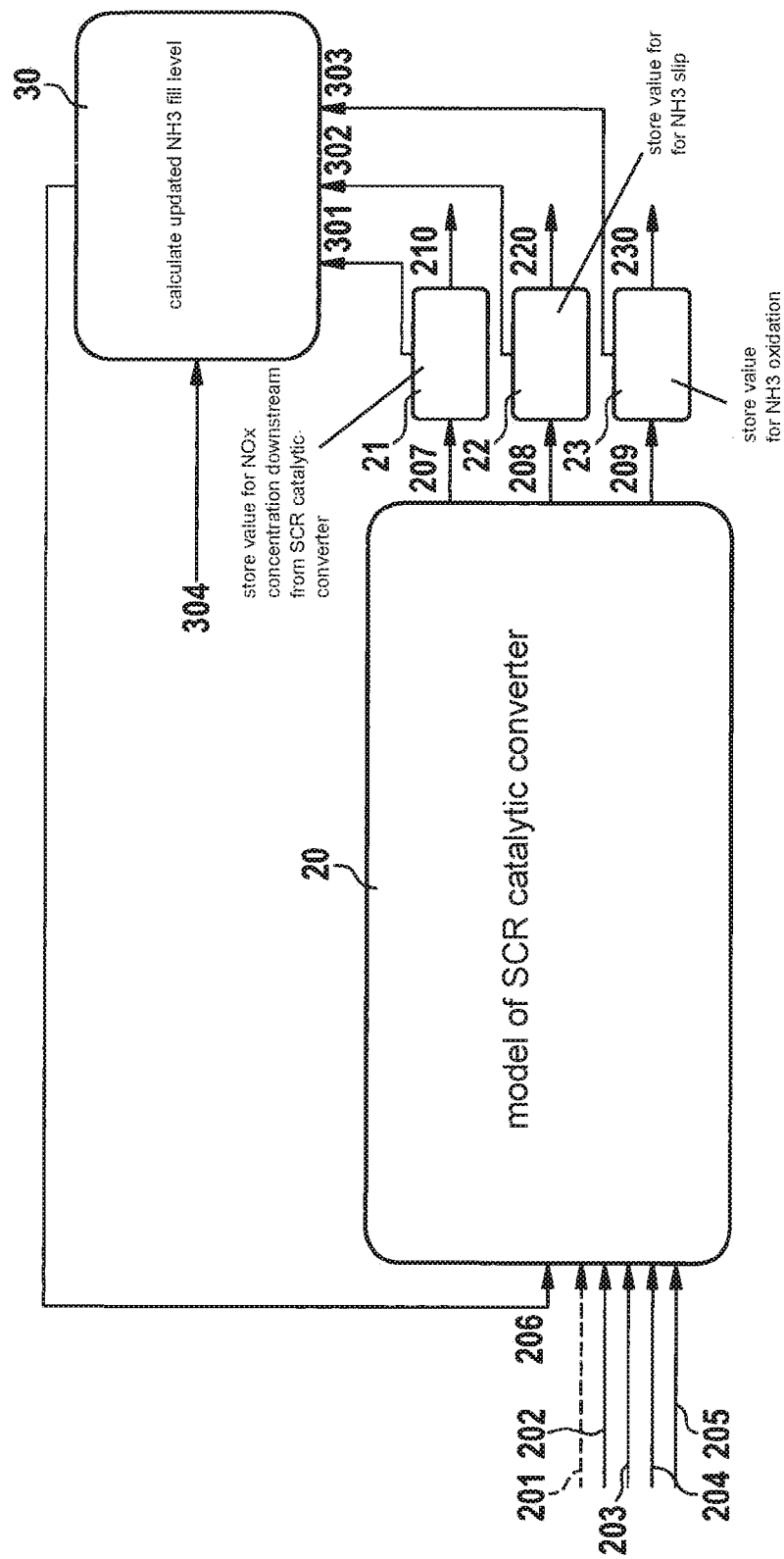
FIG. 2 schematically shows an exemplary method sequence to ascertain a $NO_x$ concentration and an $NH_3$ slip downstream from an SCR catalytic converter.

FIG. 2 schematically shows an exemplary sequence of the described method. Block 20 represents the modeling of the SCR catalytic converter to calculate the output variables of $NO_x$ concentration after the SCR catalytic converter and $NH_3$ slip of the SCR catalytic converter with the aid of at least one machine learning algorithm or at least one stochastic model. By way of example, exhaust gas temperature 202, $NO_x$ concentration upstream from the SCR catalytic converter 203, $NO/NO_2$ ratio 204 and space velocity of exhaust gas 205 are shown as input variables. In addition, in an initial step before a first calculation of the dynamic modeling, an input value 201 is selected or estimated, which represents the fill level of the SCR catalytic converter with $NH_3$. Since this value is generally not available by sensors, it must be ascertained or estimated from present or past operating variables or states. In certain operating states, e.g., at the beginning of an operation, an estimation of the fill level, e.g., to zero, may also be appropriate and sufficiently precise. The $NH_3$ fill level may also be available by storing in a non-volatile memory after the end of the trip for the beginning of the new trip, and thus the model is correctly initiated in a new driving cycle. The at least one machine algorithm or at least one stochastic model 20 provides an instantaneous output value 207 for the $NO_x$ concentration after or downstream from the SCR catalytic converter, which may be stored as value 21, and an instantaneous output value 208 for the $NH_3$ slip of the SCR catalytic converter, which may be stored as value 22, and an instantaneous output value 209 for the $NH_3$ oxidation in the catalytic converter, which may be stored as value 23. The values are here preferably calculated for an up-to-date time increment. Stored values 21, 22, or 23 may be used as values 210, 220 or 230 for other calculations in the vehicle, for example, for controlling the exhaust aftertreatment or other vehicle variables, or for diagnoses. They additionally preferably cooperate as input values 301, 302, or 303, shown as block 30, with the calculation of the updated $NH_3$ fill level based on stoichiometry and mass balance or the balance of the amount of substances. In addition, the instantaneous (carried out in the present time increment) $NH_3$ metering 304 for the SCR catalytic converter is utilized for the calculation of the updated $NH_3$ fill level. A stoichiometric calculation, which takes into account the chemical reaction occurring in the SCR catalytic converter, in particular the desirable reduction of nitrogen oxides to nitrogen, the undesirable $NH_3$ oxidation, and the $NH_3$ slip, is here carried out in calculation block 30. For this purpose, balance equations are used.

The calculated, updated $NH_3$ fill level cooperates in turn, in addition to other input variables 202 through 205 and instead of initial value 201, with calculation block 20 for the next time increment. The method is carried out iteratively for other time increments.

Artificial neural networks, such as convolutional neural networks, in particular with non-linear, exogenic inputs, may be used for calculation block 20. Alternatively, Gaussian processes such as sparse Gaussian process models, e.g., with constant deviation, are also suitable.

What is claimed is:

1. A method for ascertaining a $NO_x$ concentration and an $NH_3$ slip downstream from an SCR catalytic converter of an internal combustion engine of a vehicle, the method comprising the following steps:
 using, by a processor, state variables of an internal combustion engine as first input variables and an updated $NH_3$ fill level of the SCR catalytic converter as a second input variable, for at least one machine learning algorithm or at least one stochastic model; and
 calculating, by the processor via the at least one machine learning algorithm or at least one stochastic model, the $NO_x$ concentration and the $NH_3$ slip downstream from the SCR catalytic converter as a function of the first input variables and the second input variable;
 outputting, by the processor via the at least one machine learning algorithm or the at least one stochastic model, the calculated $NO_x$ concentration and the calculated $NH_3$ slip downstream, as calculated output variables corresponding to an output $NO_x$ concentration and an output $NH_3$ slip, wherein the output $NO_x$ concentration, the output $NH_3$ slip, and an output $NH_3$ oxidation, in addition to an instantaneous $NH_3$ metering for the SCR catalytic converter, are input variables;
 performing a stoichiometric calculation of the updated $NH_3$ fill level based on the input variables; and
 performing, by the processor, at least one of:
  controlling, as a function of the calculated output variables of the at least one machine learning algorithm or the at least one stochastic model a predictive control of an exhaust aftertreatment of the internal combustion engine or a predictive control of a drive system of the vehicle, or
  establishing, as a function of the calculated output variables of the at least one machine learning algorithm or the at least one stochastic model, an exceedance of emission variables or one of outputting a corresponding warning message or initiating a corresponding error response.

2. The method as recited in claim 1, wherein the method runs repeatedly for sequential time increments.

3. The method as recited in claim 2, wherein the at least one machine learning algorithm or the at least one stochastic model calculates the $NH_3$ oxidation in the SCR catalytic converter as a function of the first input variables and the second input variable and outputs the calculated $NH_3$ oxidation as an output variable.

4. The method as recited in claim 3, wherein the calculated, updated $NH_3$ fill level is output and is used by the at least one machine learning algorithm or the at least one stochastic model in a next time increment as the updated $NH_3$ fill level and as the second input variable for the calculation and output of the $NO_x$ concentration, the $NH_3$ slip, and the $NH_3$ oxidation downstream from the SCR catalytic converter.

5. The method as recited in claim 4, wherein, in a first time increment, an initial value is selected or estimated for the updated $NH_3$ fill level as a function of the operating state of the internal combustion engine.

6. The method as recited in claim 4, wherein in a first time increment, an initial $NH_3$ fill level of zero is selected for the updated $NH_3$ fill level.

7. The method as recited in claim 4, wherein a stored initial value is selected for the updated $NH_3$ fill level.

8. The method as recited in claim 4, wherein chemical reactions taking place in the SCR catalytic converter are taken into account in the stoichiometric calculation, the chemical reactions including a reduction of nitrogen oxides to nitrogen, an $NH_3$ oxidation, and the $NH_3$ slip.

9. The method as recited in claim 8, wherein balancing equations are used for the stoichiometric calculation.

10. The method as recited in claim 1, wherein the first input variables include at least one of: exhaust gas temperature, and/or exhaust gas pressure, and/or exhaust gas mass flow, and/or $NO_x$ concentration upstream from the SCR catalytic converter, and/or $NO/NO_x$ ratio, and/or space velocity of exhaust gas.

11. The method as recited in claim 1, wherein the calculating takes place in the vehicle during driving operation in real-time.

12. The method as recited in claim 11, wherein the calculating takes place in a processing unit of a control unit of the vehicle.

13. The method as recited in claim 12, wherein the processing unit is supported in the calculations of the at least one machine learning algorithm or the at least one stochastic model by an optimized hardware unit.

14. The method as recited in claim 11, wherein as a function of the calculated output variables of the at least one machine learning algorithm or the at least one stochastic model, monitoring or a correction of corresponding sensor output variables takes place.

15. The method as recited in claim 1, wherein the at least one machine learning algorithm is configured as an artificial neural network.

16. The method as recited in claim 15, wherein the at least one machine learning algorithm configured as a convolutional neural network, or a recurrent neural network, or a long short-term memory.

17. The method as recited in claim 1, wherein the at least one stochastic model includes a Gaussian process model, or a sparse Gaussian process, or a Student-t process.

18. A non-transitory storage medium on which is stored a computer program for ascertaining a $NO_x$ concentration and an $NH_3$ slip downstream from an SCR catalytic converter of an internal combustion engine of a vehicle, the computer program, when executed by a computer, causing the computer to perform the following steps:

using, by a processor of the computer, state variables of an internal combustion engine as first input variables and an updated $NH_3$ fill level of the SCR catalytic converter as a second input variable, for at least one machine learning algorithm or at least one stochastic model; and calculating, by the processor via the at least one machine learning algorithm or at least one stochastic model, the $NO_x$ concentration and the $NH_3$ slip downstream from the SCR catalytic converter as a function of the first input variables and the second input variable;

outputting, by the processor via the at least one machine learning algorithm or the at least one stochastic model, the calculated $NO_x$ concentration and the calculated $NH_3$ slip downstream, as calculated output variables corresponding to an output $NO_x$ concentration and an output $NH_3$ slip, wherein the output $NO_x$ concentration, the output $NH_3$ slip, and an output $NH_3$ oxidation, in addition to an instantaneous $NH_3$ metering for the SCR catalytic converter, are input variables;

performing a stoichiometric calculation of the updated $NH_3$ fill level based on the input variables; and performing, by the processor, at least one of:
controlling, as a function of the calculated output variables of the at least one machine learning algorithm or the at least one stochastic model a predictive control of an exhaust aftertreatment of the internal combustion engine or a predictive control of a drive system of the vehicle, or establishing, as a function of the calculated output variables of the at least one machine learning algorithm or the at least one stochastic model, an exceedance of emission variables or one of outputting a corresponding warning message or initiating a corresponding error response.

19. A vehicle control unit configured to for ascertaining a $NO_x$ concentration and an $NH_3$ slip downstream from an SCR catalytic converter of an internal combustion engine of a vehicle, the control unit configured to:

use, by a processor of the control unit, state variables of an internal combustion engine as first input variables and an updated $NH_3$ fill level of the SCR catalytic converter as a second input variable, for at least one machine learning algorithm or at least one stochastic model; and calculate, by the processor via the at least one machine learning algorithm or at least one stochastic model, the $NO_x$ concentration and the $NH_3$ slip downstream from the SCR catalytic converter as a function of the first input variables and the second input variable; and output, by the processor via at least one machine learning algorithm or the at least one stochastic model, the calculated $NO_x$ concentration and the calculated $NH_3$ slip downstream, as calculated output variables corresponding to an output $NO_x$ concentration and an output $NH_3$ slip, wherein the output $NO_x$ concentration, the output $NH_3$ slip, and an output $NH_3$ oxidation, in addition to an instantaneous $NH_3$ metering for the SCR catalytic converter, are input variables performing a stoichiometric calculation of the updated $NH_3$ fill level based on the input variables; and performing, by the processor, at least one of:
controlling, as a function of the calculated output variables of the at least one machine learning algorithm or the at least one stochastic model a predictive control of an exhaust aftertreatment of the internal combustion engine or a predictive control of a drive system of the vehicle, or establishing, as a function of the calculated output variables of the at least one machine learning algorithm or the at least one stochastic model, an exceedance of emission variables or one of outputting a corresponding warning message or initiating a corresponding error response.

* * * * *